US006304870B1

(12) United States Patent
Kushmerick et al.

(10) Patent No.: US 6,304,870 B1
(45) Date of Patent: Oct. 16, 2001

(54) METHOD AND APPARATUS OF AUTOMATICALLY GENERATING A PROCEDURE FOR EXTRACTING INFORMATION FROM TEXTUAL INFORMATION SOURCES

(75) Inventors: Nicholas Kushmerick; Daniel S. Weld; Robert B. Doorenbos, all of Seattle, WA (US)

(73) Assignee: The Board of Regents of the University of Washington, Office of Technology Transfer, Seattle, WA (US)

( * ) Notice: Subject to any disclaimer, the term of this patent is extended or adjusted under 35 U.S.C. 154(b) by 0 days.

(21) Appl. No.: 08/982,857

(22) Filed: Dec. 2, 1997

(51) Int. Cl.$^7$ .................................................. G06F 17/30
(52) U.S. Cl. ........................... 707/4; 707/104; 707/10; 707/6; 707/3
(58) Field of Search ................................ 707/4, 10, 104, 707/3, 6

(56) References Cited

U.S. PATENT DOCUMENTS

| | | | |
|---|---|---|---|
| 5,418,888 | * | 5/1995 | Alden ....................................... 706/48 |
| 5,634,051 | * | 5/1997 | Thomson .................................. 707/5 |
| 5,737,592 | * | 4/1998 | Nguyen et al. ........................... 707/4 |
| 5,761,656 | * | 6/1998 | Ben-Sharchar ........................... 707/4 |
| 5,768,578 | * | 6/1998 | Kirk et al. ................................ 707/100 |
| 5,826,258 | * | 10/1998 | Gupta et al. .............................. 707/4 |
| 5,857,187 | * | 1/1999 | Uenoyama et al. ...................... 707/8 |
| 5,862,325 | * | 1/1999 | Reed et al. ....................... 395/200.31 |
| 5,884,309 | * | 3/1999 | Vanechanos, Jr. ...................... 707/10 |
| 5,893,109 | * | 4/1999 | DeRose et al. ......................... 707/104 |
| 5,920,696 | * | 7/1999 | Lyn ................................. 395/200.48 |

OTHER PUBLICATIONS

Pattie Maes et al., *Learning interface agents, Proceeding of AAAI–93*, 1993.

H. Lieberman, *Letizia: An agent that assists web browsing*, Proc. 15$^{th}$ Int. Joint Conf. on. A. I.., 924–929, 1995.

Robert Armstrong et al., *Webwatcher: A learning apprentice for the world wide web*, Working Notes of the AAAI Spring Symposium: Information Gathering from Heterogeneous, Distributed Enviroments, 6–12, 1995.

Lisa Dent et al., *A personal learning apprentice*, Proc. 10$^{th}$Nat. Conf. on A.I., 96–103, 1992.

Pattie Maes, *Agents that reduce work and information overload*, Comm. of the ACM, 37(7): 31–40, 1994.

Tom Mitchell et al., *Experience with a learning personal assistant*, Comm of the ACM., 37(7): 81–91, 1994.

O. Etzioni et al., *A softbot–based interface to the Internet*, Comm. of the ACM, 37(7): 72–75, 1994.

* cited by examiner

Primary Examiner—Hosain T. Alam
Assistant Examiner—Jean M. Corrielus
(74) Attorney, Agent, or Firm—Pennie & Edmonds LLP

(57) ABSTRACT

A procedure is disclosed for automatically constructing wrappers for performing information-extraction from sites such as Internet resources that display relevant information, interspersed with extraneous text fragments, such as HTML formatting commands or advertisements. The procedure has three basic steps. First, a set of example pages are collected with a subroutine named GatherExamples. Gather Examples is provided with information describing how to pose example queries to the site whose wrapper is to be learned. Second, these example pages are labeled by a subroutine named LabelExamples—i.e., the information to be extracted from each example is identified for use in the third step. The LabelExamples subroutine uses a general framework for labeling pages using site-specific heuristics called recognizers, as well as allowing users to correct and modify the recognized instances. Finally, the labeled example pages are passed to a BuildWrapper subroutine, which constructs a wrapper.

24 Claims, 2 Drawing Sheets

METHOD AND APPARATUS OF AUTOMATICALLY GENERATING A PROCEDURE FOR EXTRACTING INFORMATION FROM TEXTUAL INFORMATION SOURCES

This invention was made with government support under grant number F30602-95-1-0024 awarded by the Air Force Office of Scientific Research. The government has certain rights in the invention.

1. FIELD OF THE INVENTION

This invention relates to retrieval of textual information. The information may be available in files stored locally or files that are accessed over public or private networks. A specific application of this invention is in providing assistance in accessing on-line electronic stores by automatically retrieving product descriptions in response to a user product query. Numerous other applications will be apparent.

2. BACKGROUND

The exponential growth of data collections, private intranets and the public Internet has produced a daunting labyrinth of increasingly numerous information sources. Searching these sources is often a chore. For example, almost any type of product is now available somewhere on a communication network, but most users cannot find what they seek, and even expert users waste copious time and effort searching for appropriate on-line stores or other product information sources.

One problem is simply the increasingly large number of available sources that are beyond the comprehension of a single user. A second problem, along with this growth in available information, is a commensurate growth in software utilities and methods to manage, access, and present this information. Each utility has a different and often unique interface and set of commands and capabilities, and is appropriate for a different set of users and a different set of information types and sources. Thus, sheer diversity of available utilities creates problems for users comparable to that created by the information explosion. Users are now faced with the twin problems of which tool to use to inquire at which information source.

In the past efforts have been made to provide users with automatic, computer assisted services that can help solve these twin problems of the network revolution. For example, AI researchers have created several prototype software agents that help users with e-mail and netnews filtering (Pattie Maes et al., 1993, Learning interface agents, *Proceedings of AAAI-93*), agents that assist with World Wide Web browsing (H. Lieberman, 1995, Letizia: An agent that assists web browsing, *Proc. 15th Int. Joint Conf. on A.I.* pp. 924–929; Robert Armstrong et al., 1992, Webwatcher: A learning apprentice for the world wide web, *Working Notes of the AAAI Spring Symposium: Information Gathering from Heterogeneous, Distributed Environments*, pp. 6–12, Stanford University, AAAI Press), agents that schedule meetings (Lisa Dent et al., 1992, A personal learning apprentice, *Proc. 10th Nat. Conf. on A.I.*, pp. 96–103; Pattie Maes, 1994, Agents that reduce work and information overload, *Comm. of the ACM* 37(7):31–40, 146; Tom Mitchell et al., 1994, Experience with a learning personal assistant, *Comm. of the ACM* 37(7):81–91), and agents that perform internet-related tasks (O. Etzioni et al., 1994, A softbot-based interface to the internet, *CACM* 37(7):72–75).

Increasingly, the information such agents need to access is available on the World Wide Web. Unfortunately, even a domain as standardized as the WWW has turned out to pose significant problems for automatic software agents. For one, although Web pages are universally written in Hypertext Markup Language ("HTML"), this language merely defines the format of information display, making no attempt to hint at its meaning or semantic content. Currently, no accepted "semantic markup language" for the Web exists, nor is one likely to be adopted universally. The Internet can be expected to pose even greater problems.

Thus, the advent of intranets, the Internet, and the World Wide Web have posed several fundamental problems for the automatic services or agents designed to assist users to find relevant information. First, no one such service has heretofore provided sufficient additional value to replace the use of a Web browser having access to existing on-line directories or indices such as Yahoo or Lycos. Second, such services have not yet been able to understand and competently parse relevant information from the responses returned from a wide variety of Internet and Web on-line information sources. Third, existing services and agents have not been easy to adapt to the ever-increasing numbers of sources with their ever-changing response formats. This is due to the individualized, hand-coded interface to each Internet service and Web site utilized by existing agents (Yigal Arens et al., 1993, Retrieving and integrating data from multiple information sources, *International Journal on Intelligent and Cooperative Information Systems* 2(2):127–158; O. Etzioni et al., 1994, A softbot-based interface to the internet, *CACM* 37(7):72–75; B. Krulwich, 1995, Bargain finder agent prototype, Technical report, Anderson Consulting; Alon Y. Levy et al., 1995, Data model and query evaluation in global information systems, *Journal of Intelligent Information Systems, Special Issue on Networked Information Discovery and Retrieval* 5(2); Mike Perkowitz et al., 1995, Category translation: Learning to understand information on the internet, *Proc. 15th Int. Joint Conf. on A.I.*). Preferably, a service or agent should be able to access a new or changed Internet on-line source in order to automatically learn how to retrieve relevant information from the source.

3. SUMMARY OF THE INVENTION

Many Internet sites display their content as a table, with rows indicating various objects, and columns indicating various attributes about the objects. For instance, an on-line store's catalog might display a table containing one row for each product, with three columns: Description, Price, and Manufacturer. At most sites, these tables are displayed using formatting commands such as HTML tags. In addition to such a table, a site's pages usually contain extraneous text such as formatting commands, advertisements or hyperlinks to the rest of the store. These pages may be thought of as semi-structured: they are more organized than free-text but not as organized as a database.

For a computer program to use such information, these tables must be identified and their information extracted, while extraneous text is ignored. For instance, to allow automatic shopping at an on-line store, a computer program must extract a page's <Description, Price, Manufacturer>triples, while ignoring any formatting commands or advertisements that might appear.

This invention is concerned with automating such an information extraction process.

It is often straightforward to write a computer program—which is called a wrapper—to perform this process for a particular site. Writing wrappers is straightforward because most sites' pages are generated automatically from a database, and so the pages have a consistent structure. For instance, at a particular store, the Price attributes might always be formatted as:

. . . <TD>$20.95</TD>. . .

One can therefore write a wrapper which scans the pages for occurrences of the delimiter string "<TD>$" (which indicates the start of a Price) and then scanning for the delimiter "</TD>" (which indicates the end of the Price). Applying this procedure to the above text fragment would extract the Price "20.95". A page's entire content can be extracted by applying similar procedures for the Description and Manufacturer attributes. (As discussed below, this description is highly simplified; real wrappers are more complicated. However, the basic idea—scanning the page for specific delimiters—works for numerous actual sites.)

While it is straightforward to write a wrapper for any particular information source, commercial information searching systems such as shopping systems might access hundreds of resources. Writing wrappers in such a setting is tedious and error-prone.

This invention comprises a technique for automatically constructing wrappers for performing information-extraction from sites such as Internet resources that display relevant information, interspersed with extraneous text fragments, such as HTML formatting commands or advertisements. The invention provides a system for learning to remove the extraneous text from such sites, while retaining and extracting the relevant content. The preferred embodiment of the invention is implemented in a procedure named "LearnWrapper."

The LearnWrapper procedure has three basic steps. First, a set of example pages are collected with a subroutine named GatherExamples. GatherExamples is provided with information describing how to pose example queries to the site whose wrapper is to be learned.

Second, these example pages are labeled by a subroutine named LabelExamples—i.e., the information to be extracted from each example is identified for use in the third step. The LabelExamples subroutine uses a general framework for labeling pages using site-specific heuristics called recognizers, as well as allowing users to correct and modify the recognized instances.

Finally, the labeled example pages are passed to a BuildWrapper subroutine, which constructs a wrapper. The implementation of BuildWrapper must be specialized to the particular class of wrappers being learned. Three specific wrapper classes—LR, HLRT and OCLR—are described below along with a general framework for how BuildWrapper can be extended to handle additional wrapper classes.

4. BRIEF DESCRIPTION OF THE DRAWING

These and other objects, features and advantages of our invention will be more readily apparent from the following detailed description of a preferred embodiment in which.

5. DETAILED DESCRIPTION OF A PREFERRED EMBODIMENT

Figure 1:
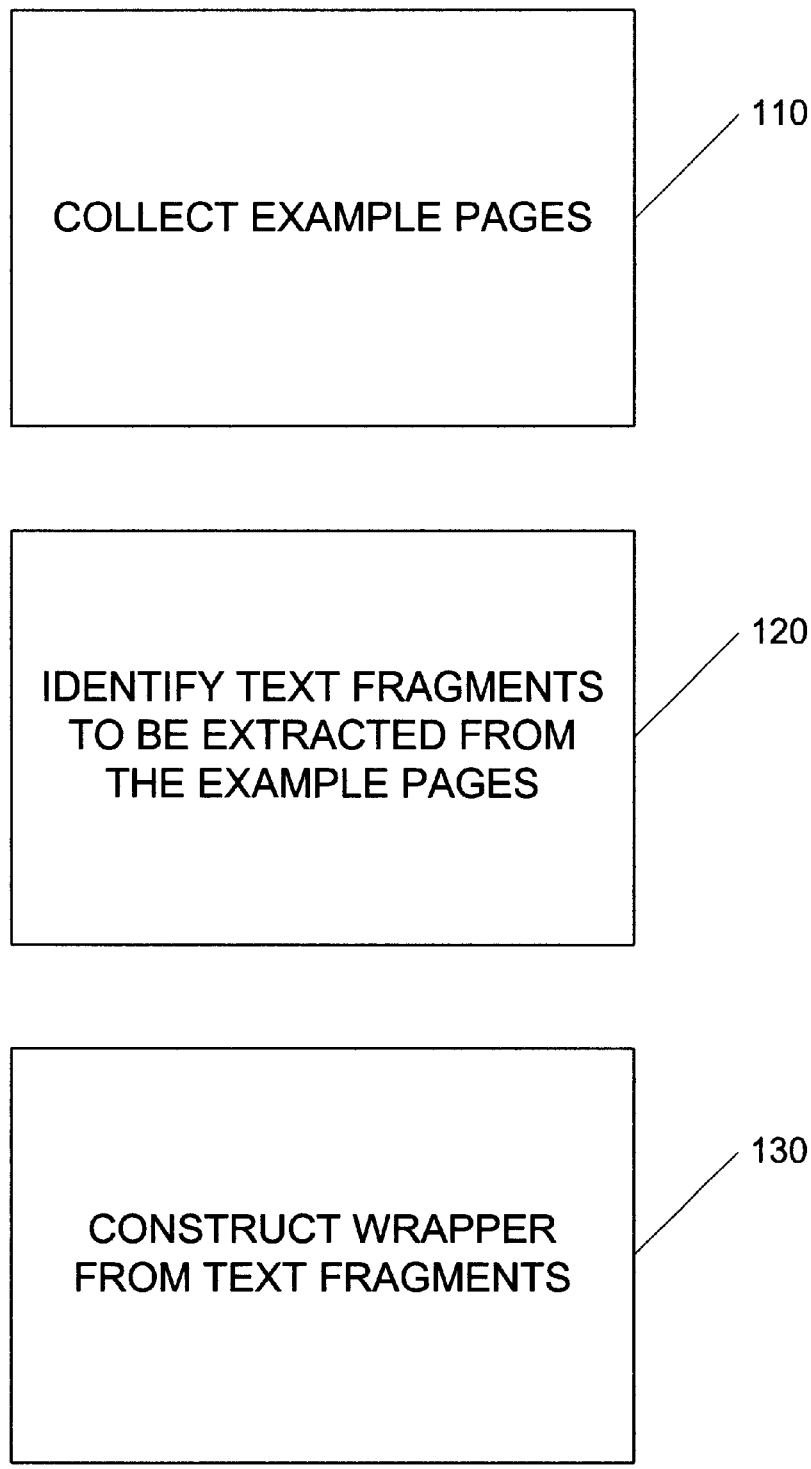
FIG. 1 is a flowchart depicting the invention.

Our LearnWrapper algorithm takes as input some information about a particular site, and outputs a wrapper for that site. As shown in FIG. 1, our algorithm proceeds in three steps.

First, at step 110, site-specific background information is used to collect a set of example pages from the site. The result is a set of pages that contain different information but that are structured identically. For instance, the LearnWrapper algorithm might query a clothing store's catalog for "black hats", and retrieve the following HTML page (which we will refer to as *P*):

EXAMPLE HTML PAGE*P*
<HTML><BODY><TABLE>
<TR><TH>Description<TH>Price<TH>Manufacturer</TR>
<TR><TD>fedora</TD><TD>$20.95</TD><TD><I>Smith Hats, Inc.</I></TD></TR>
<TR><TD>beret</TD><TD>$10.20</TD><TD><I>Jones Hat Co.</I></TD></TR>
<TR><TD>top-hat</TD><TD>$18.00</TD><TD><I>Johnson & Sons</I></TD></TR>
<TR><TD>bowler</TD><TD>$12.99</TD><TD><I>Smith Hats, Inc.</I></TD></TR>
</TABLE></BODY></HTML>

After retrieving this page, LearnWrapper collects similar pages for additional queries, such as "blue raincoats" or "green socks".

Next, at step 120, additional background knowledge is used to LABEL these examples—ie, to identify the text fragments to be extracted. The LearnWrapper algorithm uses heuristics to identify possible instances of each of the three attributes. These possibilities are then merged to produce a label for the entire page. Since this general knowledge might make mistakes, a person uses a graphical user-interface to modify the label (eg, to correct any mistakes). For instance, the LearnWrapper algorithm would label the page listed above as:

EXAMPLE LABEL *L*

| { | ( | "fedora", | "20.95", | "Smith Hats, Inc." | ), |
|---|---|-----------|----------|--------------------|----|
|   | ( | "beret",  | "10.20", | "Jones Hat Co."    | ), |
|   | ( | "top-hat",| "18.00", | "Johnson & Sons"   | ), |
|   | ( | "bowler", | "12.99", | "Smith Hats, Inc." | ) } |

LearnWrapper determines this label by using available knowledge about Prices, Descriptions and Manufacturers, and then displaying these instances to the user for modification and correction.

Finally, at step 130, a wrapper is constructed by examining these labeled examples. The LearnWrapper algorithm finds delimiters that can be used to extract the example page's content. Once such delimiters are identified, it is a simple matter to build a wrapper. For instance, suppose the algorithm observes four Price attributes:

. . .ora</TD><TD>$20.95</TD><TD>Smi. . .

. . .ret</TD><TD>$10.20</TD><TD>Jon. . .

. . .hat</TD><TD>$18.00</TD><TD>Joh. . .

. . .ler</TD><TD>$12.99</TD><TD>Smi. . .

The algorithm concludes that the Price attributes are indicated by the delimiter "<TD>$", because this delimiter is a common suffix of the text that precedes the Prices [namely, the four strings ". . .ora</TD><TD>$", ". . . ret</TD><TD>$", ". . .hat</TD><TD>$" and ". . .ler</TD><TD>"]. Similarly, the algorithm concludes that the delimiter "</TD>" indicates the end of the Price attribute, because this string is a common prefix of the text that follows the Prices ["</TD><TD>Smi. . .", "</TD><TD>Jon. . .", "</TD><TD>Joh. . .", "</TD><TD>Smi. . ."].

These three steps are combined in the LearnWrapper algorithm as follows.

Algorithm LearnWrapper input: two sources of site-specific information
    [A] how to gather examples pages from the site
    [B] how to label the site's example pages
output: a wrapper
    1. pages := GatherExamples(input [A])
    2. examples := LabelExamples(input [B], pages)
    3. wrapper := BuildWrapper(examples)
    4. return wrapper We now describe steps 1–3 in detail. (We will describe input [A] during the description of step 1, and input [B] during the description of step 2.)

5.1. STEP 1—COLLECTING THE EXAMPLES

The GatherExamples Subroutine

The GatherExamples subroutine takes input [A], the site-specific information for how to gather a set of examples from the site under consideration.

As one example, this information could be the following:
Input [A]: information for gathering examples
1. an HTML form:
    * the form's METHOD ("GET" or "POST")
    * the form's ACTION (a URL)
    * a set of VARIABLE-NAMES
        (V(1), V(2), . . . , V(Y))
    where the form has Y variables.
2. a set of VARIABLE-BINDINGS $$\{ ( B(1,1), B(1,2), \ldots , B(1,Y) ) ,$$
$$\ldots$$
$$( B(N,1), B(N,2), \ldots , B(N,Y) ) \}$$

where there are N sets of variable bindings.
For instance, the example clothing store might use the following form:
METHOD="POST"
URL="http://www.fake.com/search.cgi"
VARIABLE-NAMES=(category, color)
This background information specifies that form contains two variables (Y=2). In addition, the background information might specify the following illustrative variable bindings:
VARIABLE-BINDINGS=
    { (hat, black)
    (raincoat, blue)
    (socks, green ) }
This specifies that three example queries (N=3) are to be retrieved. Above, we listed an HTML page *P* that might be returned for the first example query.

As the following code indicates, the GatherExamples subroutine uses the values specified in [A.2] to submit the form specified in [A.1] several times, once for each example query.

Subroutine GatherExamples input: METHOD, ACTION, VARIABLE-NAMES, VARIABLE-BINDINGS
output: set of pages
pages := { }
for n=1 to N {
    pages := pages
    +
    the result of retrieving the URL specified by the given ACTION using the given METHOD, with the given variables bounds according to the nth example query—i.e., V(1)=B(n,1), V(2)=B(n,2), . . . , V(Y)=B(n,Y).
}
return pages Input [A] above represents one way that the example pages might be gathered. But it will be apparent to those skilled in the art that there are many other possibilities. Different kinds of pages may be used instead of HTML pages. For example, the page may be a file from a disk, an e-mail message or just a sequence of characters. Minor changes in gathering the example pages might involve using different protocols (FTP, Gopher, Z39.50, etc) to fetch the pages instead of HTTP. More substantial changes would be to use entirely different access mechanisms. For instance, pages from some resources might be obtained by:

sending and receiving specially-formatted electronic mail messages (eg, the LIDO Artificial Intelligence Bibliography system at the University of Saarbruecken, Germany);

interacting with a site via a "telnet" interface (eg, most searchable library card catalog systems);

using application-specific protocols (eg, the Saber airline reservation system);

retrieval from local files.

Naturally, each such technique would require its own site-specific information in place of input [A].

5.2. STEP 2—LABELING THE EXAMPLES

The LabelExamples Subroutine

After gathering a set of examples in step 1, the Learn-Wrapper algorithm invokes the LabelExamples subroutine, which computes a label for each example page. We first describe the structure of a page's label, and then describe the LabelExamples subroutine.

5.2.1. PAGE LABELS

As indicated above, a page's label is a representation of the information to be extracted from the page. For instance, earlier we listed the example page *P* and its LABEL *L*.

As this example shows, a LABEL is a set of TUPLES:
    LABEL=={ TUPLE(1), TUPLE(2), . . . , TUPLE(M) }
where the label contains M tuples. Each TUPLE(m) (1<=m <=M), is a vector of strings:
    TUPLE(m)= (STRING(1), STRING(2), . . . , STRING(K))
where each tuple contains K strings. The label corresponds to an M×K table of information. For instance, in the example LABEL *L*, M=4 and K=3, and LABEL *L* encodes a 4x3 table.

5.2.2. THE LabelExamples SUBROUTINE

As the following code illustrates, the LabelExamples subroutine takes as input the site-specific labeling information [B], and a set of pages, and outputs a label for each page. As shown, the LabelSingleExample subroutine actually computes each page's label.

Subroutine LabelExamples input: set of pages, labeling knowledge [B]
output: set of labels

```
labels :={ }
for each page in the set of pages {
    labels := labels + LabelSingleExample(page, [B])
}
return labels
```

To complete the description of the LabelExamples subroutine, we now describe its LabelSingleExample subroutine.

5.2.3. THE LabelSingleExample SUBROUTINE

The LabelSingleExample subroutine takes as input the ite-specific knowledge [B], information about how to label a age from the site. This information is as follows:

Input [B]: information for labelinq the examples a RECOGNIZER subroutine for each of the K attributes { R(1), R(2), . . . , R(K) }

A recognizer is a subroutine that takes as input a page, and outputs a set of the page's substrings. That is, for each $1<=k<=K$, recognizer R(k) is a subroutine of the following form:

```
Procedure R(k)
    input: page
    output: a set {A(1), A(2), . . . } of the page's substrings
    instances := { }
    <<<the details depend on specific recognizer >>>
    return instances
```

It will be apparent to those skilled in the art that the invention may be used with all kinds of recognizers. For example, to find occurrences of the "Price" attribute, a regular expression such as

[1-9] [0-9]*(\.[0-9] [0-9])?

could be used to find potential price attributes such as "12.99", "1024.12" and "14". Recognizers could be very complicated. For example, an English-language dictionary or thesaurus could be consulted to determine that "fedora", "beret", etc. and instances of hat types, while strings such as "Manufacturer", "<HTML><BODY><TABLE>", "</TR>" ,etc. are not instances of hats. In general, recognizers are arbitrary procedures that make use of a variety of semantic information; this invention is intended to be used with any kinds of such recognition knowledge.

The LabelSingleExample subroutine takes as input these recognizer functions as provided via input [B]. LabelSingle-Example (1) applies these recognizers to the example pages, (2) applies techniques to automatically correct or repair the recognized instances; (3) displays the results to the users and allows them to modify or correct the results, and finally (4) merges the results into a label and returns the label.

```
Subroutine LabelSingleExample
    input: page, recognizers { R(1), . . . , R(K) }
    output: label
    1. for k=1 to K {
        instances(k) := the result of invoking R(k) on the page
    }
    2. apply techniques to automatically correct or modify the recognized instances
    3. display instances(1), . . . , instances(K) to the user with a graphical user interface, and allow the user to make any corrections or modifications.
    4. label := the result of merging the instances(1), . . . , instances(K) into a label data-structure
    5. return label
```

Numerous techniques will be apparent for automatically correcting or modifying the recognized instances and/or for displaying them on a graphical user interface.

5.3. STEP 3—CONSTRUCTING THE WRAPPER

The BuildWrapper Subroutine

After LearnWrapper has gathered a set of examples with the GatherExamples subroutine (step 1) and labeled these examples with the LabelExamples subroutine (step 2), the algorithm passes these labeled examples to the BuildWrapper subroutine (step 3), which examines the examples and generates a wrapper that works correctly on all the examples.

Exactly how BuildWrapper works depends on the specific kind of wrapper being learned. This description shows how to implement BuildWrapper for three different wrapper classes, called LR, HLRT and OCLR. We conclude by discussing how to extend these techniques to cover additional wrapper classes.

5.3.1. THE LR WRAPPER CLASS

As suggested earlier, "Left-Right" (LR) wrappers operate in a very simple manner. The wrapper searches for pairs of delimiters that indicate the beginning and end of each attribute; the page is scanned for these delimiters and the extracted text returned. For instance, the ExampleWrapperLR procedure is an LR wrapper for the example clothing store site:

```
Procedure ExampleWrapperLR
    input: page
    output: label
    for each pair of delimiters (L,R) in the set
    {("<TD>","</TD>")
    ("<TD>$","</TD>"), ("<I>","</I>")} containing three elements {
        scan forward in the page to the next occurrence of the delimiter L, and then extract the substring from the page after L and before the next occurrence of delimiter R
    }
    return all extracted triplets
```

Note that this procedure extracts the example label *L* from the page *P*.

The LR wrapper class is a generalization of the ExampleWrapperLR procedure. The GenericWrapperLR procedure illustrates the LR wrapper class:

```
Procedure GenericWrapperLR
    input: page
    parameters: 2K delimiters L(1), R(1), . . . , L(K), R(K)
    output: label
    for each pair of delimiters (L(k),R(k)) in the set {(L(1),R(1)), . . . , (L(K),R(K))} containing K pairs of elements {
        scan forward in the page to the next occurrence of the delimiter L(k), and then extract the substring from the page after L(k) and before the next occurrence of delimiter R(k)
    }
    return all extracted K-tuples
```

Note that the ExampleWrapperLR procedure results from instantiating the GenericWrapperLR procedure with the parameters K=3, L(1)="<TD>", R(1)="</TD>", L(2)="<TD>$", R(2)="</TD>", L(3)="<I>" and R(3)="</I>".

Note that the behavior of the GenericWrapperLR procedure is entirely characterized by the its 2K delimiter strings. Therefore, the BuildWrapper function for the LR wrapper class need only determine these 2K delimiters. The BuildWrapper subroutine for the LR wrapper class is defined as follows:

Subroutine BuildWrapper <<LR version>> input: examples (a set of (page, label) pairs)
output: 2K delimiters L(1), R(1), . . . , L(K), R(K)
for k=1 to K {
   for each candidate in GetCandidatesR(k, examples) {
     if TestCandidateR(candidate, k, examples) {
       R(k) := candidate
       skip to next iteration of "for k=1 to K" loop
     }
   }
}
or k=1 to K {
   for each candidate in GetCandidatesL(k, examples) {
     if TestCandidateL(candidate, k, examples) {
       L(k) := candidate
       skip to next iteration of "for k=1 to K" loop
     }
   }
}
return L(1), R(1), . . . , L(K), R(K)

The BuildWrapper subroutine invokes four procedures, GetCandidatesL, GetCandidatesR, TestCandidateL and TestCandidateR.

The GetCandidatesL and GetCandidatesR procedures return a set of candidate values for a specific delimiter:

Procedure GetCandidatesL input: index k, set of examples
output: set of strings
example := an arbitrary element of the set examples
generator := the text of example's first tuple that occurs between the (k−1)st and kth attribute (or, if k=1, the text that occurs before example's first tuple)
return the set of all suffixes of generator Procedure GetCandidatesL input: index k, set of examples
output: set of strings
example:= an arbitrary element of the set examples
generator:= the text of example's first tuple that occurs between the ktn and (k+1)st attribute (or, it k=K, the text that occurs between example's first and second tuples)
return the set of all prefixes of generator For instance, the result of invoking the GetCandidatesR and GetCandidatesL procedures on the example page *P* and label *L* are as follows (the symbol "%" denotes the carriage-return character).

GetCandidatesR(1, {(*P*,*L*)}) => 10 strings
   {"</TD><TD>$", "</TD><TD>", "</TD><TD",
   "</TD><T",
   "</TD><", "</TD>", "</TD", "</T", "</", "<"}
GetCandidatesR(2, {(*P*,*L*)}) => 9 strings
   {"</TD><TD>", "</TD><TD", "</TD><T", "</TD><",
   "</TD>", "</TD", "</T", "</", "<"}

GetCandidatesR(3, {(*P*,*L*)}) => 23 strings
   {"</I></TD></TR>%<TR><TD>", "</I></TD></TR>%<TR><TD",
   "</I></TD></TR>%<TR><T", "</I></TD></TR>%<TR><",
   "</I></TD></TR>%<TR>", "</I></TD></TR>%<TR",
   "</I></TD></TR>%<T", "</I></TD></TR>%<",
   "</I></TD></TR>%", "</I></TD></TR>", "</I></TD></TR",
   "</I></TD></T", "</I></TD></", "</I></TD><",
   "</I></TD>", "</I></TD", "</I></T", "</I></", "</I><"}
GetCandidatesL(1, {(*P*,*L*)}) => 78 suffixes of page *P*'s head
"<HTML><BODY>. . .Manufacturer</TR>%<TR><TD>"
GetCandidatesL(2, {(*P*,*L*)}) => 10 strings
   {"</TD><TD>$", "/TD><TD>$", "TD><TD>$",
   "D><TD>$",
   "><TD>$", "<TD>$", "TD>$", "D>$", ">$", "$"}
GetCandidatesL(3, {(*P*,*L*)}) => 9 strings
   {"</TD><TD>", "/TD><TD>", "TD><TD>",
   "D><TD>", "><TD>",
   "<TD>", "TD>", "D>", ">"}

The TestCandidateR and TestCandidateL procedures determine whether a particular candidate is acceptable for a particular delimiter.

Procedure TestCandidateR input: candidate, index k, set of examples
output: TRUE or FALSE
   if
   (a) candidate does not occur in any of the values of the kth attribute in any of the example pages; and
   (b) candidate is a prefix of the text occurring following each value of the kth attribute in each page
   then return TRUE else return FALSE Procedure TestCandidateL input: candidate, index k, set of examples
output: TRUE or FALSE
   if candidate is a proper suffix of the text occurring immediately before each value of the kth attribute in each example page
   then return TRUE else return FALSE The TestCandidateL routine uses the terminology "proper suffix". String s1 is a proper suffix of string s2 if and only if s1 is a suffix of s2, and moreover s1 does not occur anywhere else in s2.

For instance, the result of invoking the TestCandidateL and TestCandidateR procedure on the example page *P* and label *L* for various candidates is as follows:

TestCandidateR("</TD><TD>", 1, {(*P*,*L*)}) => TRUE
TestCandidateR("</TD><TD>", 2, {(*P*,*L*)}) => TRUE
TestCandidateR("</I>", 3, {(*P*,*L*)}) => TRUE
TestCandidateR("</I></TD></TR>%</TABLE>", 3, {(*P*,*L*)}) => FALSE
TestCandidateL("<TD>", 1, {(*P*,*L*)}) => TRUE
TestCandidateL("Manufacturer</TR>%<TR><TD>", 1, {(*P*,*L*)}) => FALSE
TestCandidateL("<TD>$", 2, {(*P*,*L*)}) => TRUE
TestCandidateL("<I>", 3, {(*P*,*L*)}) => TRUE To summarize, the BuildWrapper procedure for the "Left-Right" (LR) wrapper classes uses TestCandidateL and TestCandidateR to verify each candidate returned by Get- CandidatesL and GetCandidatesR for each delimiter L(1), R(1), ..., L(K), R(K). When given the single example page *P* and its label *L*, BuildWrapper returns the delimiters L(1)="<TD>", R(1)="</TD>, L(2)="<TD>$", R(2)="</TD>", L(3)="<I>" and R(3)="</I>", from which the ExampleWrapper wrapper procedure can be generated. (Actually, there are many LR wrappers consistent with the example, and thus BuildWrapper might not return wrapper ExampleWrapperLR.)

5.3.2. THE HLRT WRAPPER CLASS

The example page *P* is very simple, and so its label *L* can be extracted using the very simple LR wrapper ExampleWrapperLR, which uses just left- and right-hand delimiters for each attribute. However, some actual Internet sites are more complicated, and there is simply no LR wrapper which can handle them. For instance, suppose the example page had been formatted as follows:

<HTML><BODY><TABLE>
<TR><TH>Office<TH>Phone Number</TR>
<TR><TD>New York</TD><TD>212-765-4321</TD></TR>
<TR><TD>Boston</TD><TD>617-234-5678</TD></TR>
</TABLE><TABLE>
<TR><TH>Description<TH>Price<TH>Manufacturer</TR>
<TR><TD>fedora</TD><TD>$20.95</TD><TD><I>Smith Hats, Inc.</I></TD></TR>
<TR><TD>beret</TD><TD>$10.20</TD><TD><I>Jones Hat Co.</I></TD></TR>
<TR><TD>top-hat</TD><TD>$18.00</TD><TD><I>Johnson & Sons</I></TD></TR>
<TR><TD>bowler</TD><TD>$12.99</TD><TD><I>Smith Hats, Inc.</I></TD></TR>
</TABLE></BODY></HTML>

This page is similar to the original except that there is an additional table listing office locations and phone numbers. There is no LR wrapper that can extract just the <Description, Price, Manufacturer>table. The problem is that the delimiters L(1)="<TD>" and R(1)="</TD>" do not reliably indicate a Description; in the beginning of the page they also indicate an office location. It turns out that there are no LR wrapper delimiters that work correctly for this example. The HLRT and OCLR wrapper classes represent different ways to avoid these problems.

The GenericWrapperHLRT procedure captures the behavior of "Head-Left-Right-Tail" (HLRT) wrappers:

Procedure GenericWrapperHLRT input: page
delimiters: 2K+2 strings H, T, L(1), R(1), ..., L(K), R(K)
output: label
scan the page for the first occurrence of delimiter H while the next occurrence of the delimiter L(1) occurs before the next occurrence of the delimiter H {

```
for each pair of delimiters (L(k),R(k)) in the set
{L(1),R(1), ..., (L(K),R(K))} containing K pairs of
elements {
    scan forward in the page to the next occurrence of
    the delimiter L(k), and then extract the substring
    from the page after L(k) and before the next
    occurence of delimiter R(k)
    }
}
return all extracted K-tuples
```

As the procedure GenericWrapperHLRT shows, HLRT wrappers operate by scanning the input page for a delimiter H that is intended to mark the end of the page's head (extraneous material at the beginning of a page), as well as for a delimiter T that is intended to mark the end of the page's tail (extraneous material at the end of a page). The HLRT version of BuildWrapper operates as follows.

Subroutine BuildWrapper <<HLRT version>> input: examples (a set of (page, label) pairs)
output: 2K+2 delimiters H, T, L(1), R(1), ..., L(K), R(K)

```
for k = 1 to K {
    for each candidate in GetCandidatesR(k, examples) {
        if TestCandidateR(candidate, k, examples) {
            R(k) := candidate
            skip to next iteration of "for k=1 to K" loop
        }
    }
}
for k = 2 to K {
    for each candidate in GetCandidatesL(k, examples) {
        if TestCandidateL(candidate, k, examples) {
            L(k) := candidate
            skip to next iteration of "for k=2 to K" loop
        }
    }
}
for each candidateH in GetCandidatesH(examples) {
    for each candidateT in GetCandidatesT(examples) {
        for each candidateL in GetCandidatesL(1, examples) {
            if TestCandidatesHTL1(candidateH, candidateT,
                                  candidateL1, examples) {
                H    := candidateH
                T    := candidateT
                L(1) := candidateL1
                    exit "for each candidateH ..." loop
            }
        }
    }
}
return H, T, L(1), R(1), ..., L(K), R(L)
```

Like implementations for the LR wrapper class, the HLRT version of BuildWrapper uses the GetCandidatesR and TestCandidateR functions to determine the value of each R(k) delimiter. Similarly, delimiters L(2), ..., L(K) are learned using GetCandidatesL and TestCandidateL. But the delimiters H, T and L(1) are identified using the GetCandidatesH, GetCandidatesT and TestCandidatesHTL1 procedures. The BuildWrapper algorithm tries all combinations of one candidate for each of H, T and L(1), and invokes the TestCandidatesHTL1 procedure on each such combination.

Procedure GetCandidatesH input: set of examples
output: set of strings
example := an arbitrary element of the set examples
generator := the text that occurs before example's first tuple
return the set of all substrings of generator Procedure GetCandidatesT input: set of examples
output: set of strings
example := an arbitrary element of the set examples
generator := the text that occurs after example's last tuple
return the set of all substrings of generator Procedure TestCandidatesHTL1 input: candidates, candidates, candidateL1, set of examples
output: TRUE or FALSE
if the following three properties hold for every example:
  (a) Let "I" be the position of the first occurrence of candidateL1 following the first occurrence of candidateH. "I" must mark the beginning of the first tuple, and furthermore I must occur before the first occurrence of candidateT following the first occurrence of candidates.
  (b) After each tuple except the last, candidateL1 must mark the beginning of the next tuple, and furthermore candidateL1 must occur before candidateT.
  (c) CandidateL1 must occur after candidateT in the last tuple.
then return TRUE else return FALSE To summarize, the implementation of BuildWrapper for the "Head-Left-Right-Tail" (HLRT) wrapper class uses the GetCandidatesL, GetCandidatesR, GetCandidatesH, GetCandidatesL, TestCandidateR, TestCandidateL and TestCandidatesHTL1 routines to obtain and evaluate candidates for the 2K+2 delimiters H, T, L(1), R(1), ... , L(K), R(K).

5.3.3. THE OCLR WRAPPER CLASS

The HLRT wrapper class uses two delimiters—H and T—to isolate a page's head and tail from its body. These additional delimiters are needed if a site's pages are complicated and therefore can not be wrapped by simple LR wrappers. Of course there is no guarantee that HLRT wrappers can handle such a site either. The OCLR wrapper class represents a second strategy for writing more expressive wrappers that can handle more complicated pages.

Specifically, the OCLR classes uses two additional delimiters, called O and C. The delimiter O indicates the opening (beginning) of each row in the table, while the delimiter C indicates the closing (ending) of each row. The GenericWrapperOCLR procedure captures the behavior of "Open-Close-Left-Right" (OCLR) wrappers:

Procedure GenericWrapperOCLR input: page
delimiters: 2K+2 strings O, C, L(1), R(1), ... , L(K), R(K)
output: label
while there are more occurrences of delimiter O in the page
{
  skip forward to the next occurrence of delimiter O
  for each pair of delimiters (L(k),R(k)) in the set {(L(1),R(1)), ... , (L(K),R(K))} which contains K pairs of elements {
    scan forward in the page to the next occurrence of the delimiter L(k), and then extract the substring from the page after L(k) and before the next occurrence of delimiter R(k)
  }
  skip forward to the next occurrence of delimiter C
}
return all extracted K-tuples The OCLR implementation of the BuildWrapper subroutine operates as follows:

Subroutine BuildWrapper <<OCLR version>> input: examples (a set of (page, label) pairs)
output: 2K+2 delimiters H, T, L(1), R(1), ... , L(K), R(K)

```
for k = 1 to K {
    for each candidate in GetCandidatesR(k, examples) {
        if TestCandidateR(candidate, k, examples) {
            R(k)   := candidate
            skip to next iteration of "for k=1 to K" loop
        }
    }
}
for k = 2 to K {
    for each candidate in GetCandidatesL(k, examples) {
        if TestCandidateL(candidate, k, examples) {
            L(k)   := candidate
            skip to next iteration of "for k=2 to K" loop
        }
    }
}
for each candidateO in GetCandidatesO(examples) {
    for each candidateC in GetCandidatesC(examples) {
        for each candidateL1 in GetCandidatesL(1, examples){
            if TestCandidatesOCL1(candidateH, candidateT,
                                candidateL1, examples) {
                O      := candidateO
                C      := candidateC
                L(1)   := candidateL1
                    exit "for each candidateO ..." loop
            }
        }
    }
}
return O, C, L(1), R(1), ... , L(K), R(L)
```

Like implementations for the LR wrapper class, the OCLR version of BuildWrapper uses the GetCandidatesR and TestCandidateR functions to determine the value of each R(k) delimiter. Similarly, delimiters L(2), ... , L(K) are learned using GetCandidatesL and TestCandidateL. But the delimiters O, C and L(1) are identified using the GetCandidatesO, GetCandidatesC and TestCandidatesOCL1 procedures. The BuildWrapper algorithm tries all combinations of one candidate for each of O, C and L(1), and invokes the TestCandidatesOCL1 procedure on each such combination.

Procedure GetCandidatesO input: set of examples
output: set of strings
example := an arbitrary element of the set examples
  sgenerator := the text that occurs before example's first tuple
return the set of all substrings of generator Procedure GetCandidatesC input: set of examples
output: set of strings
example := an arbitrary element of the set examples
generator := the text that occurs after example's last tuple
return the set of all substrings of generator Procedure TestCandidatesOCL1 input: candidates, candidatec, candidateL1, set of examples
output: TRUE or FALSE
if the following three properties hold for every example:
  (a) The first tuple must begin at the first occurrence of candidateL1 following the first occurrence of candidates.
  (b) After each tuple except the last, the position of candidateL1 following the next occurrence of candidateC must mark the beginning of the next tuple.
  (c) After the last tuple, candidates must not occur after candidateC.
then return TRUE else return FALSE To summarize, the implementation of BuildWrapper for the "Open-Close-Left-Right" (OCLR) wrapper class uses the GetCandidatesL, GetCandidatesR, GetCandidatesO, GetCandidatesC, TestCandidateR, TestCandidateL and TestCandidatesOCL1 routines to obtain and evaluate candidates for the 2K+2 delimiters O, C, L(1), R(1.), ..., L(K), R(K).

5.3.4. EXTENDING THE TECHNIQUES TO OTHER WRAPPER CLASSES

Figure 2:
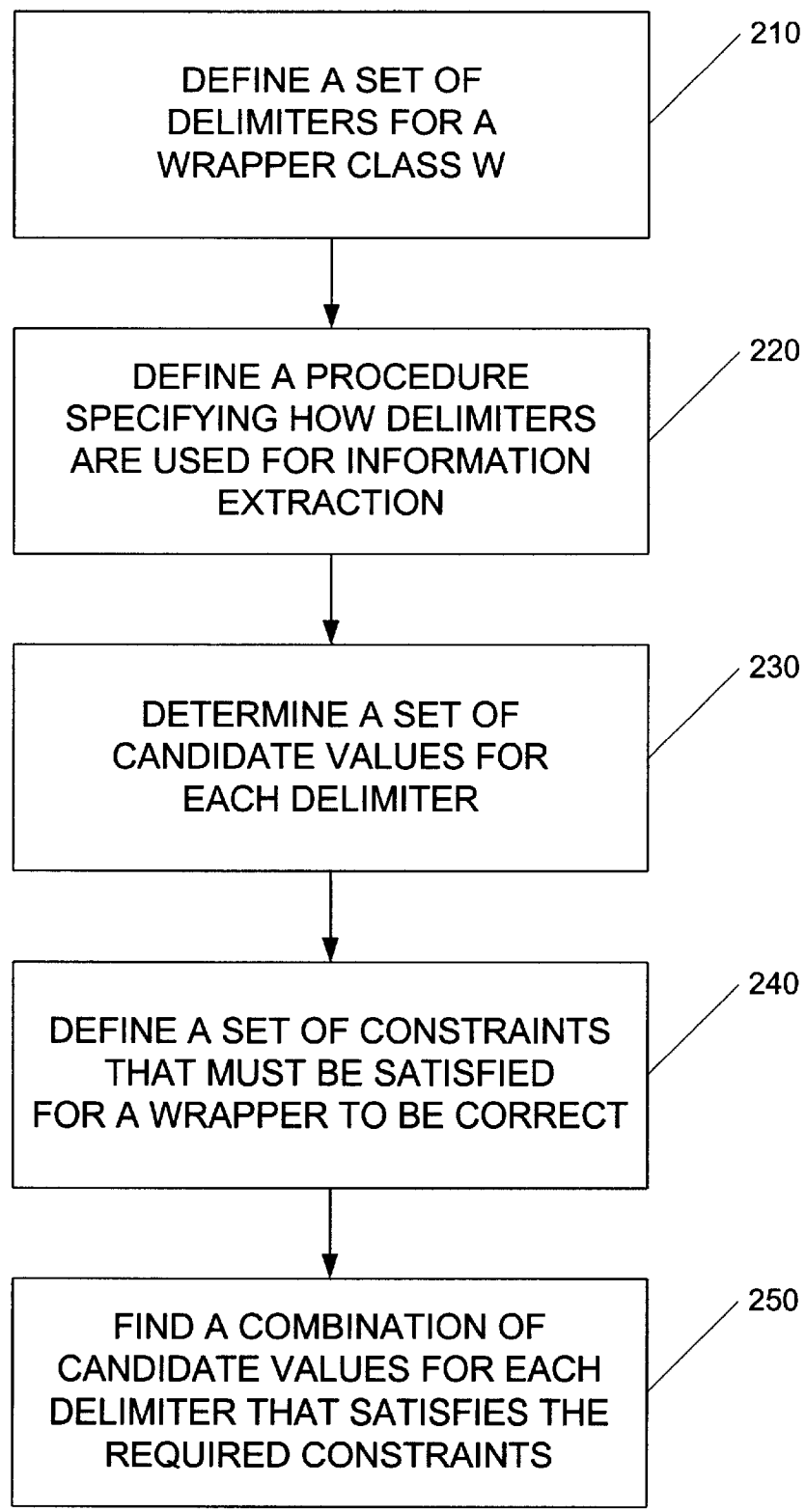
FIG. 2 is a flowchart depicting further details of the flowchart of FIG. 1.

The preceding discussion described how to implement the BuildWrapper subroutine for three different wrapper classes: LR, HLRT and OCLR. As will be apparent to those skilled in the art, the invention may also be used for learning all classes of delimiter-based wrappers learned in this example-based manner. As depicted in FIG. 2, the following steps can be used to extend the basic idea to handle additional wrapper classes.

1. First, at step 210, define the wrapper class W in terms of a set of delimiters (eg, for the LR wrapper classes, the delimiters are L(1), R(1), ..., L(K) and R(K)).
2. Then, at step 220, define the GenericWrapperW procedure, which specifies how the delimiters are used for information extraction (eg, for the LR wrapper classes, GenericWrapperLR defines how the L(k) and R(k) delimiters are used).
3. Then, at step 230, determine a set of candidates values for each of W's delimiters (eg, the GetCandidatesL routine returns the set of candidates for the L(k) delimiters).
4. Then, at step 240, define the set of constraints that must hold tor a wrapper in class W to be correct on a set of examples. (e.g., LR wrappers must satisfy the tests specified in the TestCandidateL and TestCandidateR routines).
5. Finally, at step 250, implement the BuildWrapper subroutine for class W by finding a combination of candidate values for each delimiter that satisfies the required constraints. In general, the set of all possible wrappers must be examined. Fortunately, this space can often be efficiently examined by decomposing the required constraints into sub-constraints that can be solved independently. For example, LR wrapper delimiters must satisfy the TestCandidateL and TestCandidateR constraints, but each candidate delimiter can be evaluated independently of the (2K-1) others.

Note that though we have emphasized tabular information resources, this general process applies to sites whose content is laid out in more complicated ways. For example, a site's hierarchically structured content (such as a book's table of contents) might be extracted using delimiters. The five step process just described can be generalized to handle such structuring conventions.

6. EXAMPLES

6.1. EXAMPLE I.A. SURVEY

We have described three classes of wrappers—LR, HLRT and OCLR. Before evaluating how well our learning techniques work, we measured how useful these wrapper classes are. To measure the usefulness of the wrapper classes, we conducted a survey of Internet sites, and determined for each site whether there exists a wrapper in each of the classes that can handle the site. For complete details of this survey, see Nicholas Kushmerick, PhD Dissertation, University of Washington, 1997, Section 7.2, which is incorporated herein by reference.

To maintain objectivity, we selected the survey sites from WWW.SEARCH.COM, an independently maintained index or Internet resources. At the time of the survey (July 1997), WWW.SEARCH.COM indexed about 450 resources. We randomly selected 30 (6.7%) of these sites to survey. Examples of the surveyed sites include the Yahoo People Search [www.yahoo.com/search/people] and the Expedia Currency Converter [www.expedia.com/pub/curcnvt.dll]. Our results are as follows:

| wrapper class | measured coverage |
| --- | --- |
| LR | 53% |
| HLRT | 57% |
| OCLR | 53% |
| total | 70% |

For example, of the 30 surveyed sites, 17 (57%) can be handled by the HLRT wrapper class. The last line, "total", indicates the total fraction of sites that can be covered by one or more of the wrapper classes (the three classes discussed here, as well as three additional wrapper classes).

We conclude that the wrapper classes defined are reasonably useful, because they can handle numerous actual Internet resources.

6.2. EXAMPLE II: PERFORMANCE OF THE HLRT INDUCTION ALGORITHM

We have implemented the wrapper induction algorithm for each of the wrapper classes; we now report results on the performance of the HLRT algorithm. Specifically, we measured two statistics: the running time of the algorithm, and the number of pages required to learn a wrapper that works perfectly on a set of test pages.

We have tested our algorithm on dozens of actual Internet sites; the results reported here are from a detailed evaluation of the algorithm's behavior for four Internet resources:
  OKRA [okra.ucr.edu], an email address locator service
  BIGBOOK [www.bigbook.com], a telephone directory
  COREL[corel.digitalriver.com], a stock photography archive
  ALTAVISTA [www.altavista.digital.com], a search engine Averaging across all four sites, we find that our algorithm requires less than one minute of CPU time. All experiments were conducted on SGI and SPARC workstations; the code was written in Lisp.

The system required between 3 and 15 examples to produce a wrapper that performed perfectly on a suite of test problems.

We conclude that our induction system requires relatively few examples, and relatively little computation, to learn effective wrappers.

While we have described our invention in the context of an application to on-line shopping, it will be apparent to those skilled in the art that our invention may be practiced in numerous other applications as well. In general, the methods of the invention may be applied to any situation which requires extraction of information from a textual information source.

What is claimed is:

1. A method of automatically generating a procedure for extracting information from textual information sources comprising the steps of:

collecting a set of example pages from the information sources;

identifying text fragments of interest from the example pages, and constructing the procedure using delimiters of the text fragments by:

identifying possible delimiters of the text fragment;

considering different combinations of possible delimiters; and using the combination which best matches the example pages to generate the procedure.

2. The method of claim 1, wherein the collecting step includes using a datum related to the textual information source as a guide for collecting the set of example pages.

3. The method of claim 2, wherein the datum comprises an identifier of the textual information source.

4. The method of claim 2, wherein the datum comprises a description of a method of querying the textual information source for the set of example pages.

5. The method of claim 2, wherein the datum comprises a set of variable names.

6. The method of claim 5, wherein the set of variable names includes an item category.

7. The method of claim 5, wherein the set of variable names includes an item category attribute.

8. The method of claim 2, wherein the datum comprises a variable binding.

9. The method of claim 8, wherein the variable binding comprises an item category and item category attribute set.

10. The method of claim 1 further comprising the step of labeling the set of example pages.

11. The method of claim 10, wherein the labeling step includes extracting a potential text fragment of interest from the set of example pages; and correcting the potential text fragment of interest to obtain a text fragment of interest.

12. The method of claim 11, further comprising the step creating a tuple from the text fragment of interest.

13. The method of claim 12, wherein the tuple comprises a row of a table data structure.

14. The method of claim 11 further comprising the step of applying heuristic techniques to identify the potential text fragment of interest.

15. The method of claim 11, wherein the extracting step employs recognizer algorithms to identify the potential text fragment of interest.

16. The method of claim 11, wherein the correcting step includes displaying the potential text fragment of interest for manual review.

17. The method of claim 1, wherein the identifying step comprises:

extracting a text fragment of interest from a label created in the labeling step; and parsing an example page from the set of example pages to extract potential delimiters by reference to the text fragment of interest.

18. The method of claim 1, wherein the step of considering different combinations of possible delimiters includes applying a set of requirements to a potential delimiter; and eliminating a potential delimiter that does not adhere to the set of requirements.

19. The method of claim 1, further comprising the step of selecting a procedure class, the procedure class governing the identifying, testing, and using steps.

20. The method of claim 19, wherein the procedure class is an LR procedure class.

21. The method of claim 19, wherein the procedure class is an HLRT procedure class.

22. The method of claim 19, wherein the procedure class is an OCLR procedure class.

23. A method of automatically generating a procedure for extracting information from a textual information source comprising the steps of collecting a set of example pages from the information sources;

identifying text fragments of interest from the example pages, and constructing the procedure using delimiters of the text fragments by:

defining a set of delimiters for a wrapper class, defining a generic procedure specifying how the delimiters are used for information extraction, determining a set of candidate values for each of the wrapper class's delimiters, defining a set of constraints that must be satisfied for a wrapper in the wrapper class to be correct and finding a combination of candidate values for each delimiter that satisfies the set of constraints.

24. The method of claim 23 wherein the step of constructing the procedure using delimiters of the text fragments comprises the steps of:

identifying delimiters of the text fragments and using such delimiters to generate the procedure.

* * * * *